United States Patent [19]

Helms et al.

[11] Patent Number: 4,825,165

[45] Date of Patent: Apr. 25, 1989

[54] METHOD AND APPARATUS FOR DETECTING A TRANSIENT PHENOMENON BY MONITORING VARIATIONS OF AN ALTERNATING COMPONENT OF A VERTICAL CURRENT EMANATING FROM THE EARTH'S SURFACE

[76] Inventors: Ronald L. Helms, 10165 Palmer Dr., Oakton, Va. 22124; Claude V. Swanson, 1800 Old Meadow Rd., Reston, Va. 22102

[21] Appl. No.: 37,052

[22] Filed: Apr. 13, 1987

Related U.S. Application Data

[63] Continuation of Ser. No. 678,568, Dec. 5, 1984, abandoned, which is a continuation-in-part of Ser. No. 404,459, Aug. 2, 1982, Pat. No. 4,507,611, which is a continuation of Ser. No. 876,163, Feb. 8, 1978, abandoned.

[51] Int. Cl.$^4$ .................. G01V 3/08; G01W 1/16; G01R 19/00; G01R 23/00
[52] U.S. Cl. ..................... 324/323; 324/72; 324/326; 324/344; 324/348; 340/601
[58] Field of Search ............... 324/72, 102, 323, 326, 324/330, 334, 335, 344–349; 340/601; 73/170 R

[56] References Cited

U.S. PATENT DOCUMENTS

| | | | |
|---|---|---|---|
| 3,149,278 | 9/1964 | Cartier et al. | 324/345 |
| 3,324,385 | 6/1967 | Hings | 324/344 XR |
| 3,737,842 | 6/1973 | Bobrin | 324/345 X |
| 4,198,596 | 4/1980 | Waeselynck et al. | 324/355 X |
| 4,507,611 | 3/1985 | Helms | 324/348 X |

OTHER PUBLICATIONS

J. Alan Chalmers, On The Conductivity of the Air in Thunderstorms, Jol. of Geophysical Research, Jan. 15, 1964, pp. 357–361.

Stanislaw Michnowski, Atmospheric Electricity and its Application to Meteorology, Publs. Inst. Geoph. Polish Acad. Sci., 1976 p. 1–15.

P. O. Ezema & C. A. Onwumechilli, A Profile Study of Geomagnetic Variations in the Nigerian Equatorial Electrojet Region, J. Geomag. Geoelec., 1984, pp. 97–111.

G. W. Hoffman & V. D. Hopper, Electric Field and Conductivity Measurements in the Stratoshere, Intl. Conf. on the Universal Aspects of Atmospheric Electricity, 4th Tokyo (1968), Planetary Electrodynamics Proceedings; Publ. by Gordon and Breach (1969), pp. 475–495.

Charles Polk, Relation of Elf Noise and Schumann Resonances to Thunderstorm Activity, Intl. Conf. on the Universal Aspects of Atmospheric Electricity, 4th Tokyo (1968), Planetary Electrodynamics Proceedings; Publ. by Gordon and Breach (1969), pp. 55–83.

S. B. Anisimov, et al., Short-Period Variations of the Vertical Electric Current in the Air, J. Geomag, Geoelectr., 1984, pp. 229–238.

(List continued on next page.)

Primary Examiner—Gerard R. Strecker
Attorney, Agent, or Firm—Marks, Murase & White

[57] ABSTRACT

A method and apparatus for locating and evaluating surface and subsurface anomalies by detecting, monitoring or measuring transient or local variations respectively which occur in an alternating component of a vertical current having a frequency characteristic which emanates from the earth's surface in the region being monitored or measured. For locating fixed anomalies, local variations which occur in the amplitude, frequency and frequency modulation of the alternating component of the vertical current are measured. For detecting the passage of moving or transient anomalies, a stationary detector is positioned to detect any change in the vertical alternating current leakage in the vicinity of the detector which is caused by a moving or transient anomaly such as a submerged submarine, seismic activity, or sustained severe wheather. For accuracy enhancement and redundancy, simultaneous measurements of the signal strength in multiple frequency bands may be used.

32 Claims, 3 Drawing Sheets

OTHER PUBLICATIONS

Toshio Ogawa, et al., Schumann Resonances and Worldwide Thunderstorm Activity, Intl. Conf. on the Universal Aspects of Atmospheric Electricity, 4th Tokyo (1968), Planetary Electrodynamics Proceedings; Publ. by Gordon and Breach (1969), pp. 85–91.

M. B. Gokhberg, et al., Possible Effects of the Action of Electric Fields of Seismic Origin on the Ionosphere, Geomag & Aeronomy, vol. 24, No. 2, 1984, pp. 183–186.

E. M. Wilkins, The Role of Electrical Phenomena Associated with Tornadoes, Geomag. & Aeronomy, vol. 24, No. 2, Jun. 15, 1964, pp. 2435–2447.

S. Chandra & R. A. Goldberg, Geomagnetic Control of diffusion in the Upper Atmosphere, Jol. Geophysical Researach, vol. 69, No. 15, 1964, pp. 3187–3197.

M. N. Fatkullin, Some Remarks Concerning the Electrical Conductivity of the Atmosphere, Oct. 1964, pp. 446–448.

METHOD AND APPARATUS FOR DETECTING A TRANSIENT PHENOMENON BY MONITORING VARIATIONS OF AN ALTERNATING COMPONENT OF A VERTICAL CURRENT EMANATING FROM THE EARTH'S SURFACE

The present application is a continuation of application Ser. No. 678,568 (now abandoned) which was a continuation-in-part of application Ser. No. 404,459 filed on Aug. 2, 1982 which is a continuation of application Ser. No. 876,163 filed on Feb. 8, 1978 now abandoned.

BACKGROUND OF THE INVENTION

1. Field of the Invention

The present invention generally relates to a method and apparatus for monitoring transient physical phenomenon such as seismic activity and to monitor the passage of surface and subsurface "anomalies" such as surface vessels or submarines. More specifically, the present invention relates to monitoring transient physical phenomenon or the passage of anomalies by monitoring changes in an alternating component of a generally vertical current which emanates from the earth.

2. Description of the Prior Art

As detailed in U.S. Pat. No. 4,507,611, the contents of which are hereby incorporated by reference, many techniques are known in the prior art for performing geographical prospecting. For example, Ruehle, et al., in U.S. Pat. No. 3,363,457, teaches that the measurement of radiant energy from subsurface formations enables geophysical prospecting. Weber, in U.S. Pat. No. 4,044,299 teaches a prospecting technique which includes the use of an inductive exciter which induces alternating current energy into the area and structure of the earth which is to be observed. Measurement of the induced current energy enables an artisan to determine the underground environment of the area.

A method and apparatus for measuring subsurface electrical impedance utilizing first and second successively transmitted signals at different frequencies is taught by Madden, et al. in U.S. Pat. No. 3,525,037.

In U.S. Pat. No. 3,942,101 Sayer teaches a geophysical prospecting device which utilizes a distortion of the atmospheric electrostatic potential gradient which is suggested to be a result of the Nernst effect. Sayer teaches that the distortion provides a means for locating subterranean sources of geothermal energy.

The earth's electromagnetic field also has naturally occurring alterations of the type known as "magnetic noise". Slichter, in U.S. Pat. No. 3,136,943, discloses that such noise is the product primarily of lightening and other electrical discharges and phenomenon. Geothermal prospecting can be performed by detecting variations in the naturally occurring electromagnetic radiations from thunderstorms or other phenomenon. The detection and measurement of short-term variations in the earth's magnetic field for geothermal prospecting is described in U.S. Pat. No. 3,126,510 to McLaughiin.

Prospecting can also be performed by comparing simultaneous variations of an underground electric field and a magnetic field which results from the circulation of telluric currents. This comparison of electric and magnetic fields requires the use of electrodes to measure the internal telluric currents in the magnetic field according to Cagniard; see U.S. Pat. No. 2,677,801.

The above mentioned generally vertical current having an alternating component is distinct from the above-mentioned telluric currents for many reasons. Firstly, telluric currents are usually direct currents. Secondly, telluric currents occur only within the earth whereas the generally vertical current having an alternating component emanates from the earth's surface over land and water. Thirdly, telluric currents exhibit local discontinuities and are not based on ionic impingement of solar winds. In contrast, the generally vertical current having an alternating component has generally predictable time variations due to the constant directivity (generally vertical), depth, and diurnal character.

A 1982 publication by the Soviet Academy of Sciences entitled *Electro-Magnetic Precursor to Earthquakes* includes a passage in reference to measurements made using a pair of electrodes, one positioned at the bottom of a five-hundred meter deep shaft and the other at the top of that shaft. During a period of seismic activity, electrical currents having high frequency components were measured between the electrodes.

Machts et al., in U.S. Pat. No. 2,124,825, describe an apparatus for investigating the electric and magnetic field conditions in an area being surveyed in order to locate irregularities indicative of earth strata, rock fractures, oil and water-bearing earth formations, etc.

Stanton, in U.S. Pat. No. 2,659,863, describes a method and apparatus for determining the presence of oil, mineral, and other subterranean deposits by measuring variations in a vertical potential gradient in the atmosphere near the surface of the earth.

Morrison, U.S. Pat. No. 2,784,370, describes a prospecting device for locating subterranean anomalies which utilize measurements of electrical potential at or near the surface of the earth which results from "terrestitial electricity".

Barringer, in U.S. Pat. No. 3,763,419, describes a method and apparatus for geophysical exploration which utilizes very low frequency fields produced by distant transmitters as a source of a primary field. A vertical component of that field is used as a stable reference against which variations caused by discontinuities in the earth conductivity can be measured.

Miller, et al., in U.S. Pat. No. 4,041,372, describes a system which utilizes a current source to provide an input signal having predetermined frequency components, amplitude relationships, and duration. A plurality of spaced-apart detectors are used to make differential electrical measurements which permit cross correlation with the input signal.

In summary, the prior art teaches geophysical prospecting which utilizes variations in naturally occurring electrostatic potential gradient, alternations in the earth's electromagnetic field, short-term variations in the earth's magnetic field and simultaneous variations of the underground electric field and magnetic field and other devices which require the use of induced primary fields. These prior art techniques are in contrast to the present invention which utilizes a generally vertical alternating current emanating from the earth, the existence of which is confirmed by the Soviet Academy of Sciences report.

SUMMARY OF THE INVENTION

It is an object of the present invention to provide an improved method for monitoring the type and size of a moving surface or subsurface object or the occurrence of a transient phenomena by monitoring and analyzing a generally vertical electrical current having an alternating component which emanates from the earth and the modulation of the frequency spectrum of the alternating component.

It is a further object of the invention to enable the accurate determination of the nature of a passing object by the combined use of amplitude comparison of the alternating component of a generally vertical electrical current coupled with empirically derived computer programs designed to provide specific identification of an object due to the recording and analysis of the alternating component of the electrical current.

Another object of the present invention is to evaluate and locate moving man-made and natural objects such as submarines, ice flows, or ocean currents.

Another object of the invention is to provide an alternative to the magnetic compass as a means of determining a heading reference. This is possible since the generally vertical current having an alternating component produces a stronger energy level when an associated antenna is oriented east-west and a lesser signal when oriented north-south.

It is yet a further object of the invention to provide a method for monitoring transient events such as the passing of a submarine, a seismic disturbance, or the approach of a severe weather system by providing a stationary sensor and monitoring any variation in the generally vertical current having an alternating component caused by that transient event.

The disclosed method of monitoring transient events includes the steps of providing one or more stationary detectors at a region of the earth to be monitored, measuring local variations which occur in the amplitude, frequency, and frequency modulation of the generally vertical electric current having a frequency characteristic which emanates from the earth's surface, and recording these measurements to provide a record of the transient phenomena or using the detected signal to activate a visual or audio alarm or to operate an automatic system.

Preferably, the detected signal is divided into a plurality of frequency channels so that identifying information regarding the anomaly can be extracted.

A presently preferred embodiment for monitoring the alternating frequency components is also disclosed.

Additional objects, advantages, and novel features of the invention will be set forth in part in the description which follows, and in part will become apparent to those skilled in the art upon examination of the following or will be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate various embodiments of the present invention and, together with the description, serve to explain the principles of the invention. In the drawings.

DETAILED DESCRIPTION OF THE INVENTION

Figure 1:
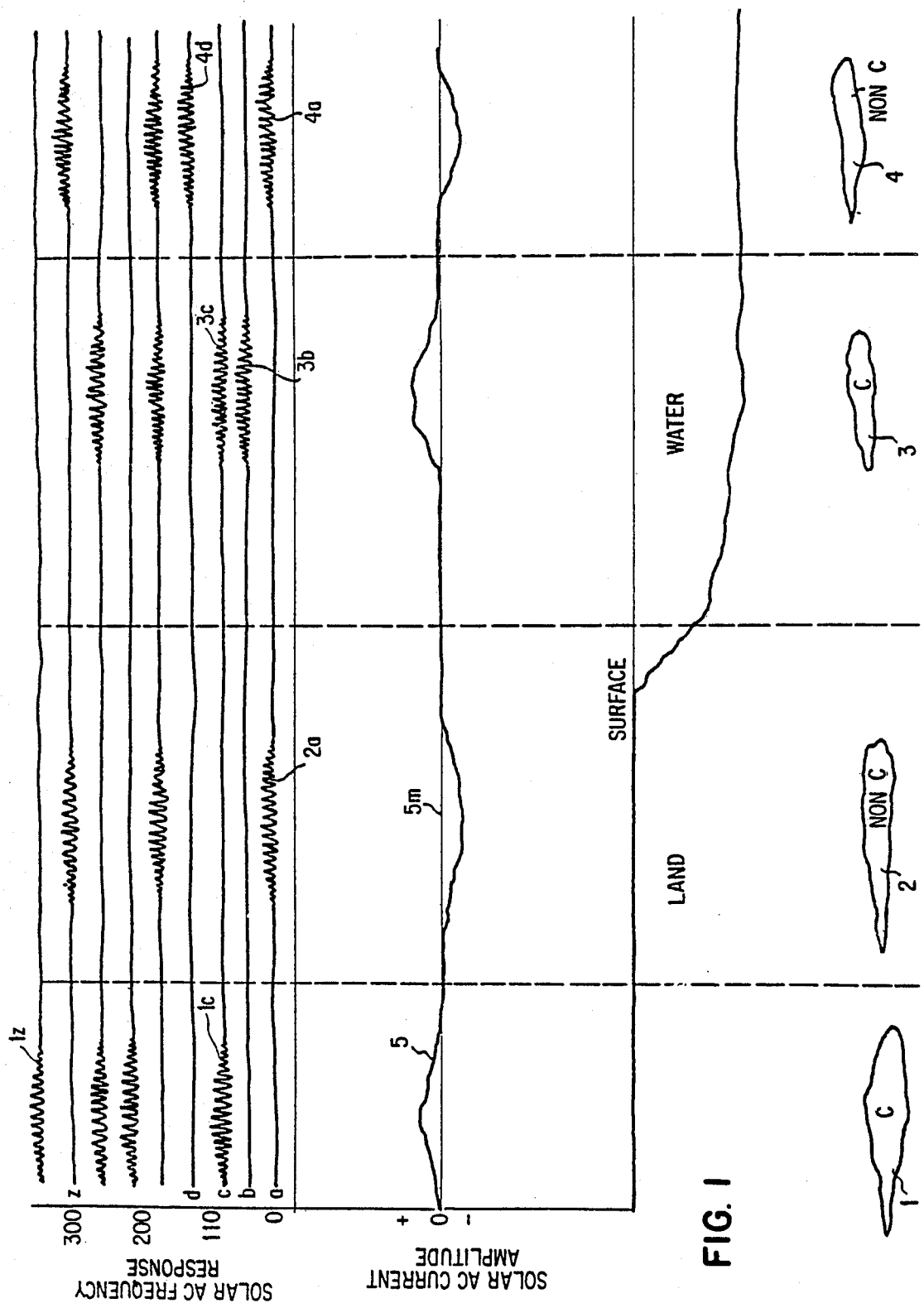
FIG. 1 represents a cross-section of the earth illustrating a surface/atmosphere interface and various subsurface and underwater anomalies as well as simulated data corresponding thereto.

As a poor conductor, a subsurface deposit such as oil, results in an ionic "shadow". Good conductor deposits such as iron ore results in a "focusing" ionic effect. Just as light in the visible spectrum permits intelligence gleaning through frequency modulations and resulting color differentials, the above-described generally vertical current leaking from the earth is also made of a spectrum of frequencies which are modulated through electrical resonance in unique ways by specific deposits, thus enabling remote identification of any surface and subsurface anomalies through which they have passed.

Accordingly, by sensing, recording and subsequently analyzing the measured amplitude, frequency and frequency modulations of the alternating current component emanating from the earth's surface, and correlating this data with geographical location, a systematic means such as that detailed in U.S. Pat. No. 4,507,611 for exploration of subsurface resources becomes possible.

The generally vertical current leakage from within the earth into the atmosphere occurs with a predictable geographic pattern indicative of natural and man-made substructure content. The monitoring, recording, and interpretation of the rate of leakage of the generally vertical current, plus the frequency spectrum and resonance modulation of that spectrum, forms the basis for the present invention which employs the fact that anomalous conductivity results in anomalous electric current variations.

Further, it should be understood that a change in the local conductivity in the earth's interior will effect the generally vertical current leaking into the atmosphere above the earth. An anomaly within the earth will therefore be reflected as an atmospheric anomaly in terms of the characteristics of the alternating component of the emanating current.

The monitored anomalous electrical activity falls into two categories. The first category is an anomalous object which moves near the earth's surface and disturbs the earth's magnetosphere. The second category is observed electrical anomalies from apparent stationary surface or subsurface conductive anomalies, the time variation of which disturbs the earth's magnetosphere.

An example of the first category, moving objects, might comprise a submarine whose passing would be manifested by a change in the electrical current emanating from the earth.

An example of the second category, stationary objects, might be a conductive anomaly, either man-made or naturally occurring, such as a steel spheres or the like, which, if placed below the earth's surface, would result in an increased local electrical leakage within the earth's magnetosphere, thus producing a local alteration in electrical current flow.

Using the steel sphere example, it should be understood that phase and amplitude relationships existing in the frequency spectrum of the alternating component of the electric current emanating from the earth are modified by the steel sphere. If these changes are observed under water, they appear as a modulation of existing electrical noise. If these changes are monitored above the surface, the basic RF carrier from the existing current becomes a modulated RF in close proximity to the steel sphere. If the vertical alternating current leakage to the side of and directly above the steel spheres is measured, the current flow above the sphere is higher.

If relative humidity is measured simultaneously with the variations in alternating current over water, it will be noted that a local increase in relative humidity frequently accompanies the electrical anomalies. If local relative humidity increases, the remote RF energy may be forward scattered and at times, even back scattered if the local relative humidity change is great enough. Both a temperature change in the water above the submerged steel sphere as well as a change in the radiometric infrared characteristics of the surface are also to be expected. Whether the temperature and infrared emissivity increases or decreases will depend upon the direction of the emanating current. By measuring these auxiliary variables, such as humidity and temperature, one can improve upon the accuracy and sensitivity of the basic multifrequency alternating current measurement. This technique of measuring additional auxiliary variables is useful in several applications, such as the detection of submarines, the advance prediction of severe weather, and earthquake detection.

In the case of submarine detection, the auxiliary variables of humidity, D.C. vertical electric field, and atmospheric refractive index changes are useful phenomena in improving the accuracy of the measurement. Submarines cause a variety of disturbances besides current anomalies which are the principal variables measured by the present technique. For example, a moving submarine may cause hydrodynamic disturbances, including modification of the surface waves which leads to enhanced wave breaking. This will cause a local increase in humidity in the atmosphere above the submarine, and will modify the refractive index of the atmosphere. In addition, the aerosol produced by the breaking process will modify the D.C. vertical electric field above the submarine. Consequently, the simultaneous measurement of these variables will reduce the false alarm rate of the detector, and improve its accuracy.

Similarly, in the case of severe weather predictions, monitoring such phenomena as atmospheric pressure, D.C. electric field, temperature, time and lunar position can provide compensating information to enhance the accuracy of weather anomaly detection. For example, changes in atmospheric pressure frequently accompany weather changes. Specifically the magnitude and rate of pressure changes can be a sensitive although somewhat late indicator of imminent weather changes. Electrical anomalies, which are measured according to the present invention, predicts these changes earlier. However, by analyzing electrical current changes, in view of atmospheric pressure changes, the accuracy of the prediction can be improved.

In the case of earthquake prediction, there are several phenomena which are known to frequently accompany seismic phenomena. For example, microcracking resulting from subterranean rock stresses releases ozone and other ions into the air. These can be detected directly, and also act as nucleation sites for fog when atmospheric humidity is favorable. Consequently, for earthquake protection variables such as atmospheric ion levels, ozone, and ground fog may be measured simultaneously with the alternating current anomalies discussed above to enhance the accuracy of the prediction.

The inventive monitoring device is preferably designed to weigh environmental parameters such as those discussed above, and evaluate the multifrequency band alternating current measurements in view of these parameters to achieve enhanced accuracy in predicting various phenomena.

The generally vertical current having a frequency component is believed to be caused by ions which leak from the nonpolar areas of the earth as a weak, low noise signal which is reproducably measurable and which results in the above-described resonance phenomena.

The frequency, amplitude and resonance frequency modulation of the weak, low-noise signal provides data which, when properly interpreted, may be used to indicate information regarding subsurface or surface anomalies through which the signal has passed and to locate and identify the surface or the subsurface anomaly. This is due to the fact that the anomaly will provide varying amplitude, frequency, and frequency resonance modulation depending upon its ionic occultation or conduction properties. Ionic conduction variations are dependent upon the extent of the area and size of the anomaly as well as the type of material of which the anomaly is composed. Correlation of this information with empirically determined electrical resonance data allows the determination of specific substance identity, composition, and size.

The sensing, recording, and analysis of variations in the earth's generally vertical electrical current and modulations in the alternating spectrum of that current due to alternating electrical current resonances of natural or man-made objects or transient phenomena such as weather may be accomplished by the disclosed method. The present method is equally applicable to subsurface, surface and above surface observation. The disclosed invention employs variations in the alternating component of the electrical current emanating from the earth and the observed modulations in its frequency spectrum resulting from electrical resonance phenomena to provide location and identification of man-made and natural subsurface objects and/or deposits, or of transient phenomena such as severe weather. This is in contrast to the electrostatic potential gradient changes referred to in the above-noted prior art, which by definition, is a direct current phenomenon. In addition, according to the present invention, there is no need for electrodes as discussed in the Soviet Academy of Sciences literature or for the utilization of telluric current or magnetic fields or variations thereof. According to the present invention, variations in the alternating component of the current emanating from the earth may be measured by a suitably resonant antenna.

The disclosed method has many applications including monitoring geological fault regions of the earth for seismic activity which may precede earthquakes or monitoring strategic regions of the earth for the passage of the submarines or ice flows. Further, since severe weather may be preceded by changes in conductivity of the earth's magnetosphere, the relevant frequency spectrum can be analyzed to predict the arrival of severe storms or weather patterns.

Turning now to the accompanying drawing and particularly FIG. 1, in the lower portion of FIG. 1 there is depicted a cross-section of a typical surface/atmosphere interface. Reference character 1 generally refers to a subsurface conducting anomaly. Reference character 2 refers to a subsurface non-conducting anomaly. References characters 3 and 4 refer to subsurface and underwater conducting and non-conducting anomalies respectively.

The upper portion of FIG. 1 illustrates several graphs which correlate data similar to that which would result from the performance of the method described in U.S. Pat. No. 4,507,611; which method will be now briefly reviewed as background.

The atmosphere above a predetermined region of the earth which is to be prospected is first traversed. This step can be accomplished by any convenient vehicle such as an aircraft. During a traverse, local variations which occur in a generally vertical current having an alternating component are measured. This measurement can be accomplished by any apparatus which allows the measurement of a root means square (RMS) or average of the alternating current component, depicted in FIG. 1 as an amplitude occurring between the earth and atmosphere. The spectral resonances depicted are measured in a 1 Hz through 1 MHz range. It should be understood that these frequency range limits are exemplary only and that a higher upper limit or lower bottom limit can be used. U.S. Pat. Nos. 3,849,722 and 3,701,940 describe prospecting apparatus which may be used for determining the complex electric field generated when an alterating component is induced into the earth. Such apparatus may be used by one skilled in the art to measure the alternating current component of the generally vertical current occurring in the atmosphere above a predetermined region of the earth as it is traversed.

The next step includes the recording of the measurements in correlation with the spatial relation of the point of the measurement to determine significant measurements indicative of surface or subsurface anomalies. Recording the measurements can be accomplished by any recording apparatus which is connected to the sensing apparatus used to measure local variations. In the alternative, the recording can be accomplished by an individual taking periodic readings. The measurements taken can be correlated with the spatial relation of the point of the measurement by a technique such as that as described in U.S. Pat. No. 3,976,937 which discloses apparatus for recording sensor positions by the use of aircraft. A determination of significant measurements indicative of surface and subsurface anomalies requires the correlation of data with the comparison of prospecting results by the use of a computer or other means. As an alternative, the teachings of U.S. Pat. No. 4,041,372 regarding a method of deriving parameters relative to subsurface strata can be used.

An aircraft is the preferred medium for searching since it provides the highest search rate at the lowest cost. A trailing-wire antenna can be towed from an aircraft. Such a trailing-wire antenna may be attached to an amplitude/frequency processor which is used to perform the measuring step of the invention. The other side of the processor may be grounded to the airframe. This produces a time rate of change measurement of the alternating current component. Any antenna which will sense the flow of the alternating current component may also be used.

As shown in the upper portion of FIG. 1, the measurement of the alternating current component preferably includes measurement of the frequency, amplitude, and frequency resonance modulation. Considering the simulated data appearing in FIG. 1, reference character 5 refers to a graphical illustration of the full frequency RMS value of the alternating current component amplitude. It can be seen by a comparison of the graphical illustrations to anomalies 1, 2, 3 and 4 that the alternating current amplitude is anticipated to be above a given mean level; for example, 5 milliamperes, when recording over conducting anomalies 1 and 3 and below the mean level when recording over the nonconducting anomalies 2 and 4. The specific differential of the alternating current component amplitude of the mean level may be used by the artisan to determine the type, amount, and area extent of the detected anomaly. This data may be used in conjunction with the alternating frequency resonance data as detailed below.

The alternating current component frequency and frequency resonance modulation is preferably measured in a series of different frequency ranges, for example ranges a,b,c,d, . . . z. In the present example, the overall, anticipated frequency range preferably varies from 1 Hz to 1 MHz. The amplitude variation enables the observer to determine, for example, information regarding the area of the anomaly. The frequency resonance enables the observer to identify specific aspects of the anomaly through the establishment of empirical data. For example, it is anticipated that certain nonconducting anomalies will generate "signature" modulated frequency patterns such as those shown by reference characters 4a and 2a at frequency level "a". A different "signature" pattern would be generated by various conducting anomalies. In other words, specific types of anomalies will only effect uniquely defined, empirically determined frequency ranges and only a specific type of a anomaly would result in a measurement within a specific frequency range. For example, frequency "d" is indicative of a reaction from the nonconducting anomaly 4 as indicated by reference character 4d. This type of data is also applicable to conducting anomalies as shown by frequency "b" where only the conducting anomaly, 3, is illustrated as yielding a reaction; see reference character 3b.

Certain frequency ranges, such as frequency "c" may indicate a reaction to all conducting anomalies as depicted by reference characters 1c and 3c.

Due to the fact that the alternating current component comprises a part of the a vertical current leakage resulting from ionic impingement on the earth, it is advisable that the solar activity causing such ionic impingement be monitored in order to enhance the measurement process. Such solar activity can be monitored by any known technique ranging from visual observation of auroral strength or sunspot activity to the measurement of gamma, self x-ray and other radiation emanating from the sun. A primary source of such measurements is data collected from satellites.

When solar activity is high, highly conductive deposits will cause a localized increase in the alternating current component flow. However, the total data abstracted from such an anomaly will still produce a unique pattern. By recording both amplitude changes and modulation of the frequency spectrum, identifying characteristics as well as the location of subsurface deposits or other anomalies becomes possible with a precision and cost unequaled by other methods.

As will be understood by the artisan, by modifying the above described method, similar but stationary apparatus to that described above may be used to detect transient phenomena. For example, if seismic activity in the vicinity of a geological fault is to be monitored, a detector may be located near the fault. When no seismic activity is occurring, there will be no change in the amplitude of the alterating current component as the function of time since the detector is held stationary.

The amplitude of alternating current components will only exhibit a time rate of change when a transient "anomaly" occurs in the vicinity of the detector. Similarly, if the passage of a large conducting or nonconducting mass past the vicinity of a given point is to be detected, a detector can be positioned at the point. A detector so positioned will display an amplitude variation in the local alternating current component as the mass moves past. Thus, the present method may be used to remotely detect the passage of a submerged submarine, ice flow, or the like.

It should also be appreciated that the present invention may be used to detect the imminent approach of large severe weather systems toward the vicinity of a stationary detector inasmuch as such large and severe weather systems will cause a characteristic change in the amplitude of the alternating current component. From empirically determined frequency distribution data, information regarding the nature of the weather disturbance can be ascertained.

Figure 2:
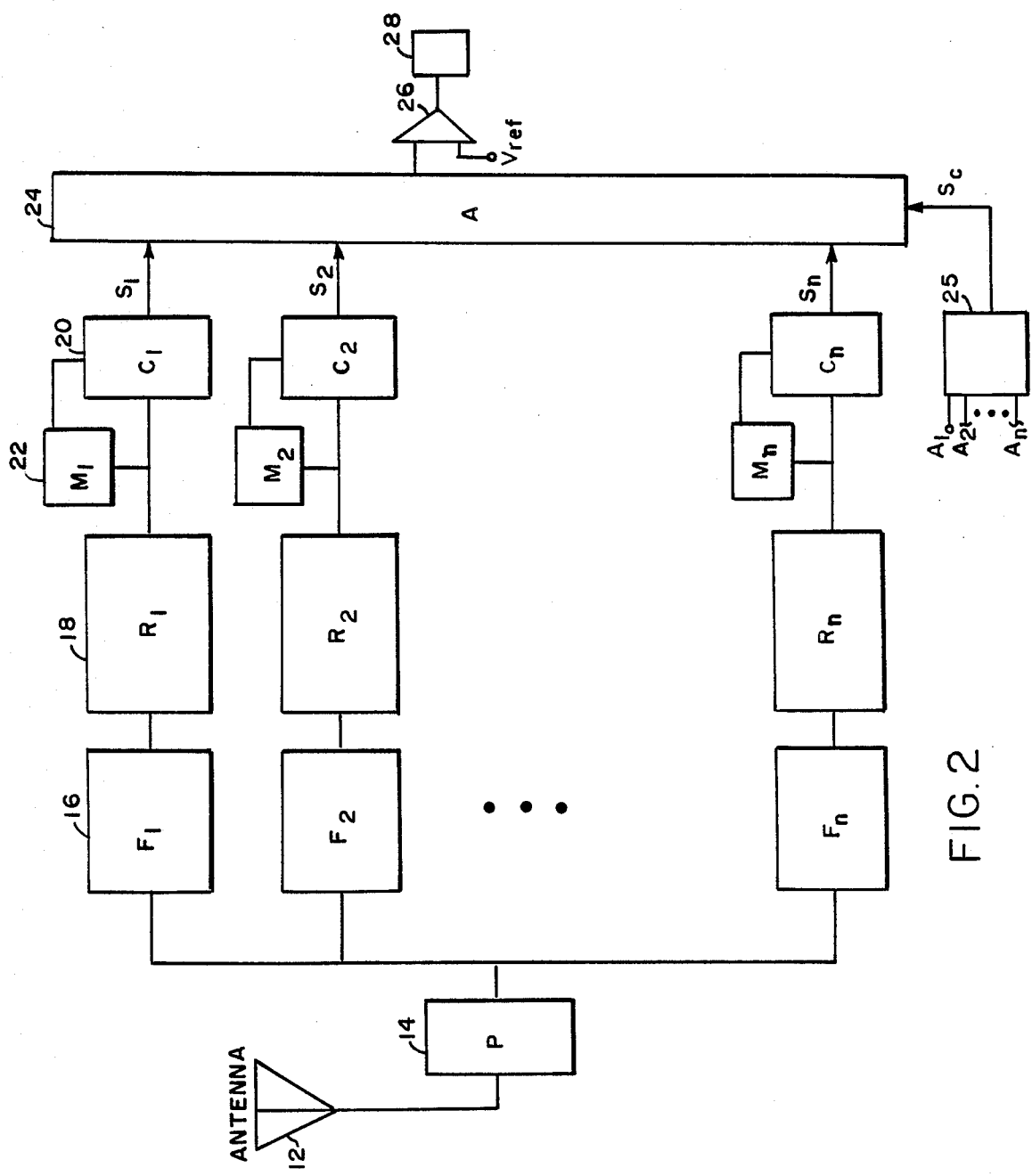
FIG. 2 is a schematic block diagram of the first embodiment of a detector according to the present invention.
Figure 3:
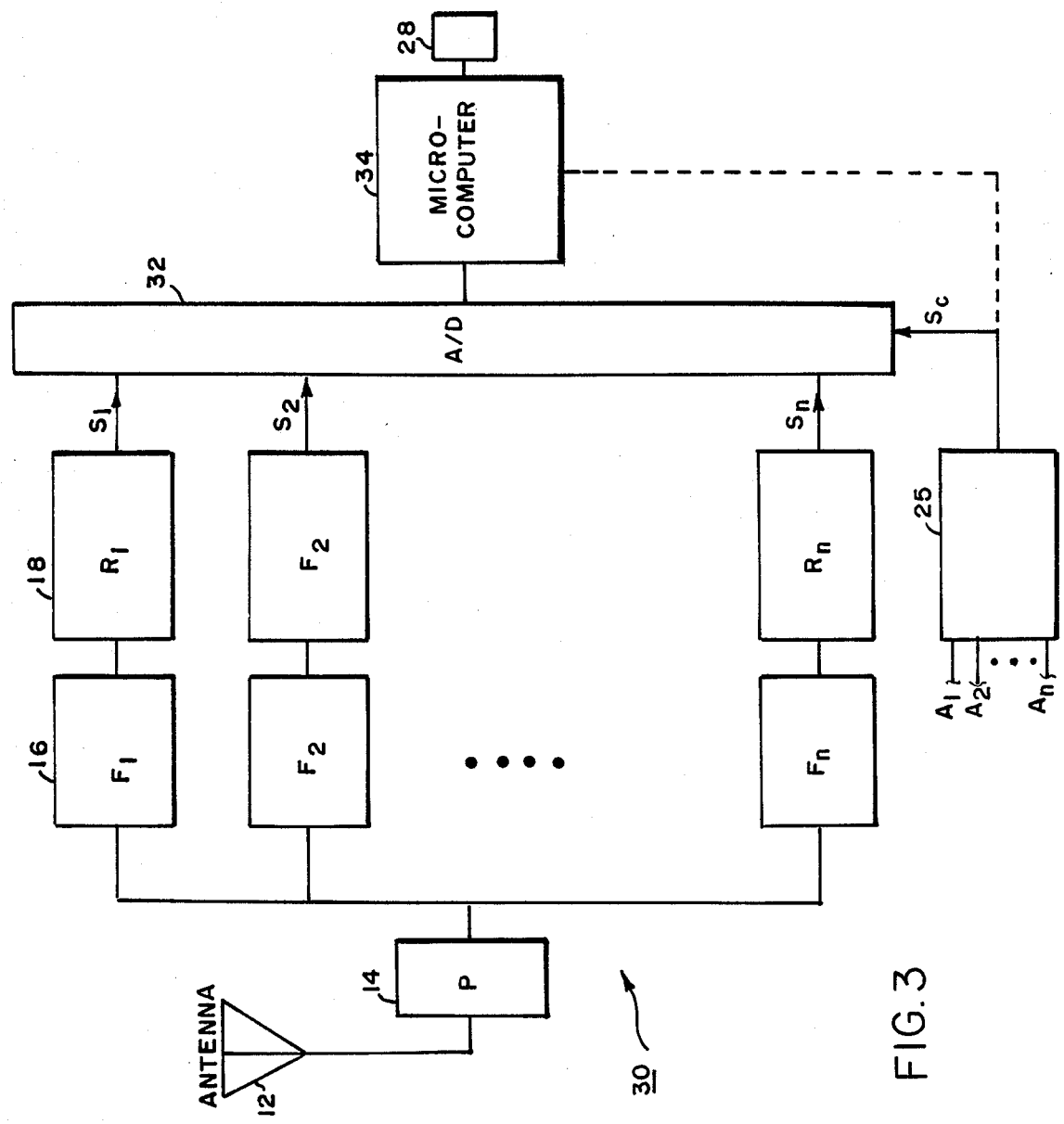
FIG. 3 is a schematic block diagram of the second embodiment of a detector according to the present invention.

Turning now to FIGS. 2 and 3, examples of presently preferred embodiments of detectors useful for practicing the present method are illustrated. In FIGS. 2 and 3, like numerals are used to designate similar components. Referring first to FIG. 2, the reference number 10 generally refers to the detector unit. Signals are received at an antenna 12. The antenna may be a loop antenna of the type described in *Antennas and Transmission Lines* by John A. Kueken, 1st ed., 1969, chapter 15. Alternatively, the antenna may be of the type described in *Antennas and Transmissions Lines* (supra), chapter 14, page 73, et seq.

The output of the antenna is amplified by a preamplifier 14. The preamplifier may be of the type described in *Application Manual For Operational Amplifiers*, Philbric/Nexus Research, Nimrod Press, 1968. The amplifier illustrated in circuit III.38 is suitable for use with a loop antenna and the amplifier circuit illustrated in III.39 is suitable when used in connection with a traveling-wave antenna.

The output from the preamplifier is preferably filtered into "n" bands by "n" band pass filters 16. The band pass filters may be of the type described in *Application Manual For Operational Amplifiers* (supra), see circuit illustration designated III.27. Preferably, the frequency bands range from very low frequencies to high frequencies. For example, the lowest frequency band might cover the range of 1 Hz to 10 Hz. The next highest frequency band may cover the range from 10 to 100 Hz, the next highest frequency band may cover the range from 100 Hz to 1 kHz, etc., up to high frequencies such as 1 MHz. The signals monitored in different frequency bands yield information useful for different purposes. For example, low frequencies may be used to provide early warnings of very deep phenomenon such as earthquakes occurring far below the surface of the earth or ocean. For monitoring transient phenomena occurring near the surface, higher frequency bands would be more useful. As a general rule, it is preferable to monitor each frequency for relative changes over time in order to obtain as much useful information as possible regarding the transient phenomena which is occurring. It is noted that for purposes of predicting severe weather systems, frequency ranges as low a 0.1 Hz to 1 Hz may be used.

The output from the band pass filter is fed to a rectifying circuit, 18, which outputs a signal indicative of the mean amplitude of the signal in each frequency band over a time period $T_i$. The averaging period $T_i$ is chosen so that it will be much less than the time over which the transient phenomenon being observed takes place. A typical rectifier may be of the type described in *Electronics Designers Handbook*, 2nd Ed. revised, L. J. Giacoletto, McGraw Hill, 1977, Sec. 12.4.

The output of each of the time-averaging rectifiers 18 is inputted to a respective comparator circuit 20, which compares the output of the time averaging rectifier 18 with the output of a second time averaging circuit 22. Each time-averaging circuit 22 will typically average the output of an associated time-averaging circuit 18 over a longer time period $t_l$ which is much larger than $T_i$. Typically, $t_l$ is on the order of, or greater than, the time scale of the observed transient phenomenon. Thus, the time-averaging circuit 22 provides a "reference" value for the comparator 20. The time-averaging rectifier circuit 22 may also be of the type described in *Application Manual For Operational Amplifiers* (supra). In other words, similar averaging filter designs may be suitable for both the short-term and long-term averaging circuits 18 and 22; only the averaging time periods used in each circuit need be different. The signals ($S_1, S_2 \ldots S_n$) from the comparators 20 of each of the frequency bands are combined in an "adder" 24. Various suitable adding circuits are described in the *Application Manual For Operational Amplifiers* (supra). While the adder 24 is normally an adder, it should be understood that the signals $S_1, S_2 \ldots S_n$ from some frequency bands are added while others are subtracted. Whether a signal is added or subtracted depends upon whether the amplitude change in the frequency range is a transiently increasing or decreasing one for the particular phenomenon being monitored.

An auxiliary signal generator 25 may be used to generate a "corrective signal" ($S_c$) which is inputted to the adder 24 in order to enhance the accuracy of the measurements by weighing pertinent environmental parameters $A_1, A_2 \ldots A_n$ in the manner detailed above. As will be understood by the artisan, the generator 25 may simply comprise a junction point for inputting pertinent environmental parameters to be the adder 24. Alternatively, the generator 25 may have an appropriate transfer function for weighing the inputted environmental parameters and generating therefrom the corrective signal $S_c$.

In order to automatically determine when a transient phenomenon has occurred, the output from the adder 24 may be compared with a reference signal, $V_{ref}$, in a comparator 26, the reference signal representing a threshold level. Whenever the output of the adder 24 exceeds the threshold level, a signal will be outputted to an indicator or recording device 28.

Turning now to FIG. 3, there is depicted a more general purpose configuration for the detector 10. In FIG. 3, the detector is generally referred to by the reference 30. In a manner similar to that described above with reference to FIG. 2, signals are received at antenna 12 and are amplified by a preamplifier 14. The signals from the preamplifier 14 are filtered into "n" frequency bands by "n" band pass filters 16 and the mean amplitude in the signals in each frequency band is calculated by the time-averaging rectifying circuit 18. As before, circuit 18 produces a rectified average over a time period $T_i$ of the signal which is in that frequency band. The averaging period is chosen so that it will be much less then the time period over which the transient phenomenon being observed takes place. The averaged signals ($S_1, S_2 \ldots S_n$) are then converted into digital signals by an analogue to digital (A/D) converter 32. A suitable A/D converter would be of the type sold by Metrabyte Corporation, Model DASH 16. The output from the A/D converter 32 is inputted into a microcomputer or microprocessor 34 for processing. The microprocessor operates to compare any variations in signal strength in the various frequency bands and to process the results in specific ways depending upon the type of transient phenomenon being observed. The microprocessor 34 may comprise a portable desk-top type computer such as the IBM PC.

As before, an auxiliary signal generator 25 may be used to input a compensating signal $S_c$ to the A/D convertor 33, or alternatively, as indicated by the dashed connection in FIG. 3, may input a digital signal directly to the microprocessor 34. A recording or indicating device 28 may be connected to the microprocessor 34 in order to utilize the output therefrom. Alternatively, an output signal from the microprocessor 34 indicative of the occurrence of the transient phenomenon might be used to actuate an alarm or other device.

The foregoing description of the invention has been presented for purposes of illustration and description. It is not intended to be exhaustive or to limit the invention to the precise forms disclosed, and obviously many more applications and variations are possible in light of the above teachings. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method of monitoring a transient phenomenon occurring on or beneath the surface of the earth and in the vicinity of a location of interest, comprising the steps of:
   positioning a detector at said location;
   measuring with said detector, an alternating component of a generally vertical current having a frequency characteristic which emanates from the earth in the vicinity of said location;
   monitoring said alternating component of the generally vertical current emanating from the earth for variations indicative of the occurrence of said phenomenon;
   correlating said variation with data indicative of said phenomenon to determine the occurrence of said phenomenon.

2. The method of claim 1 wherein said transient phenomena comprises a vessel passing in the vicinity of said location.

3. The method of claim 2 whereas said vessel comprises a submerged submarine.

4. The method of claim 1 wherein said transient phenomenon comprises a subsurface seismic event.

5. The method of claim 1 wherein said transient phenomenon comprises a weather disturbance.

6. The method of claim 1 wherein the step of measuring further comprises measuring variations which occur in a frequency of said generally vertical current emanating from the earth.

7. The method of claim 6 wherein the step of measuring further measuring variations which occur in an amplitude of said generally vertical current emanating from the earth.

8. The method of claim 1 wherein the step of measuring further comprises measuring local variations which occur in an amplitude of said generally vertical current emanating from the earth.

9. The method of claim 8 wherein the step of measuring further comprises measuring variations which occur in a frequency modulation of said generally vertical current emanating from the earth.

10. The method of claim 1 wherein the step of measuring further comprises measuring local variations which occur in a frequency modulation of said generally vertical current emanating from the earth.

11. The method of claim 10 wherein the step of measuring further comprises measuring local variations which occur in said frequency characteristic of said generally vertical current emanating from the earth.

12. The method of claim 11 wherein the step of measuring further comprises the step of measuring local variations which occur in an amplitude of said generally vertical current emanating from the earth.

13. The method of claim 1 further comprising the step of monitoring solar activity and evaluating the measured alternating component of the generally vertical current in accordance with said solar activity.

14. The method of claim 12 further comprising the step of monitoring solar activity and evaluating the measured alternating component of the generally vertical current in accordance with said solar activity.

15. A method of monitoring a transient phenomenon comprising:
   receiving, with an antenna, signals indicative of an alternating component of a generally vertical current emanating from the earth;
   filtering said signals into at least two frequency bands;
   time averaging the signals within each of said at least two frequency bands;
   processing said time-averaged signals with data corresponding to said phenomenon to thereby indicate the occurrence of said transient phenomenon.

16. The method of claim 15 further comprising the step of measuring auxiliary environmental phenomena, and wherein the step of processing further comprises evaluating the time averaged signals in view of the measured auxiliary environmental phenomena.

17. The method of claim 15 further comprising the step of amplifying said signals indicative of the alternating component of the generally vertical current prior to the step of filtering.

18. The method of claim 15 wherein said step of time averaging further comprises the steps of rectifying and averaging over a time period $T_i$, the signals in each of said frequency bands.

19. The method of claim 18 wherein the time period $T_i$ is less than a time period over which said transient phenomenon occurs, and said step of processing further comprises averaging said rectified and averaged signals in each frequency band over a period $t_i$, where $t_i$ is greater than $T_i$, and then comparing the signals time averaged over $T_i$ with the signals time averaged over $t_i$ wherein $t_i$ is at least on the order of the time period over which said transient phenomenon occurs.

20. The method of claim 19 wherein the step of processing further comprises outputting a signal from each frequency band whenever the signal time averaged over $T_i$ is greater than the signal time averaged over $t_i$ by more than a threshold value, and combining output signals from said frequency bands together.

21. The method of claim 20 further comprising the step of measuring auxiliary environmental phenomena, and wherein the step of processing further comprises combining a signal representative of the measured auxiliary environmental variables with the time averaged signals.

22. The method of claim 18 wherein said step of processing further comprises converting the rectified and averaged signals into digital signals and processing said signals in a digital computer programmed to identify the transient phenomenon.

23. An apparatus for detecting the occurrence of a transient phenomenon comprising:
means for receiving a signal indicative of an alternating component of a generally vertical current emanating from the earth;
means connected to said receiving means for filtering said signal into a plurality of signals corresponding to a plurality of frequency bands;
means connected to said filtering means for time averaging the signals in each of said frequency bands;
means connected to said time averaging means for processing the time-averaged signals with data corresponding to said phenomenon to thereby indicate the occurrence of the transient phenomenon.

24. The apparatus of claim 23 wherein said receiving means comprises an antenna.

25. The apparatus of claim 24 wherein said receiving means further comprises means for amplifying said signal.

26. The apparatus of claim 23 wherein said filtering means comprises a plurality of band-pass filters corresponding to said plurality of frequency bands.

27. The apparatus of claim 23 further comprising a corrective signal generator for measuring auxiliary environmental variables and generating a corrective signal therefrom to said processing means.

28. The apparatus of claim 23 wherein said time averaging means comprises a rectifier means for rectifying and time averaging over an averaging period $T_i$, each of said plurality of signals, wherein the time period $T_i$ is less than a time period over which the transient phenomena occurs.

29. The apparatus of claim 28 wherein the processing means further comprises means for averaging said rectified and time averaged signals over an averaging period $t_i$, where $t_i$ is greater than $T_i$ and means for comparing the signals time averaged over the period $T_i$ with the signals time averaged over the period $t_i$, wherein the period $t_i$ is at least on the order of the time period over which said transient phenomenon occurs.

30. The apparatus of claim 29 wherein said comparing means produces an output signal from each frequency band whenever the signal time averaged over $T_i$ is greater than the signal time averaged over $t_i$ by more than a threshold value, and said processing means further comprises means for combining the output signals from said frequency bands together.

31. The apparatus of claim 30 further comprising a corrective signal generator operable to monitor auxiliary variables and to generate therefrom a corrective signal to said combining means.

32. The apparatus of claim 28 wherein said processing means further comprises an analog to digital converter connected to rectifier means, and a digital computer connected to receive input signals from said analog to digital converter and programmed to identify a transient phenomenon from said input signals.

* * * * *